April 25, 1967  H. A. LEFLET, JR  3,315,774
SHEET SUPPORTING APPARATUS
Filed Sept. 16, 1965  3 Sheets-Sheet 1

INVENTOR.
Herbert A. Leflet, Jr.
BY
Nobbe & Swope
ATTORNEYS

April 25, 1967 H. A. LEFLET, JR 3,315,774
SHEET SUPPORTING APPARATUS
Filed Sept. 16, 1965 3 Sheets-Sheet 2

INVENTOR.
Herbert A. Leflet, Jr.
BY
Nobbe & Swope
ATTORNEYS

April 25, 1967  H. A. LEFLET, JR  3,315,774
SHEET SUPPORTING APPARATUS
Filed Sept. 16, 1965  3 Sheets-Sheet 3

INVENTOR
Herbert A. Leflet, Jr.
BY Nobbe & Swope
ATTORNEY

United States Patent Office 3,315,774
Patented Apr. 25, 1967

3,315,774
SHEET SUPPORTING APPARATUS
Herbert A. Leflet, Jr., Toledo, Ohio, assignor to Libbey-Owens-Ford Glass Company, Toledo, Ohio, a corporation of Ohio
Filed Sept. 16, 1965, Ser. No. 487,821
5 Claims. (Cl. 193—37)

This invention relates generally to conveyors and, more particularly, to roller type conveyors for transporting heated glass sheets.

During the manufacture of many different glass products, the glass is heated to elevated temperatures for various reasons such as to heat treat the glass thereby changing its physical characteristics or to soften the glass permitting it to be shaped to a preselected curvature. For example, glass sheets intended for use as glazing closures, particularly as glazing closures in vehicles or the like, are often bent to various curvatures so they will blend into the overall design for the vehicle and, whether curved or flat, are usually tempered to increase the strength of the glass and to modify its breaking characteristics so that should the glazing closure be broken, the sheet will disintegrate into relatively small harmless pieces rather than large jagged pieces.

In both of these procedures, the glass sheets are first heated to a temperature near the softening point of the glass, are bent if desired, and are then rapidly chilled from the elevated temperature to a temperature below the annealing range of the glass, which chilling results in the outer layer or "skin" of the sheet being placed under compressive stress.

In the commercial production of these glazing closures, whether they be curved or flat, the glass sheets are processed while being supported on a conveyor, usually of the roller type, and moved successively through a heated atmosphere to bring the glass to the desired temperature and subsequently through a chilling area wherein a cooling medium such as air or the like is directed against the opposite surfaces of the sheets to trapidly cool the glass and impart the desired temperature thereto. While at the elevated temperatures required in these processes, the sheets are subject to so-called transmitted distortion caused by the configuration of the conveyor rolls and their surfaces, being in a heat softened condition, are very susceptible to being scuffed, scratched or otherwise marred as the result of the physical contact with the conveyor. Such distortion of the sheets or marring of the surfaces of the sheets, should it occur to any degree, would, of course, render the sheets unacceptable for their intended use as glazing closures.

The primary obqject of this invention is to provide an improved conveyor having novel rollers which do not adversely affect the heated sheets.

Another object is to provide a conveyor roller having a new and improved tubular covering which does not mar the surfaces of the sheets.

Another object is to provide a covering of the above-described character formed from a material having a relatively long service life while exposed to comparatively high elevated temperatures as compared with materials heretofore used.

Still another object is to provide a conveyor roll covering which forms a cushion for the glass sheet being moved thereover.

Other objects and advantages of the invention will become more apparent during the course of the following description when read in connection with the accompanying drawings.

In the drawings, wherein like numerals are employed to designate like parts throughout the same:

While the invention has been discussed above with reference to a process for bending and/or tempering glass sheets, it should be appreciated that the invention offers worthwhile advantages when used in the practice of any process involving the conveying of glass sheets, particularly heated glass sheets. Thus, although the invention is shown herein and will be described in detail as incorporated in an apparatus for bending and tempering glass sheets, there is no intention that the invention be limited to this particular environment.

Figure 1:
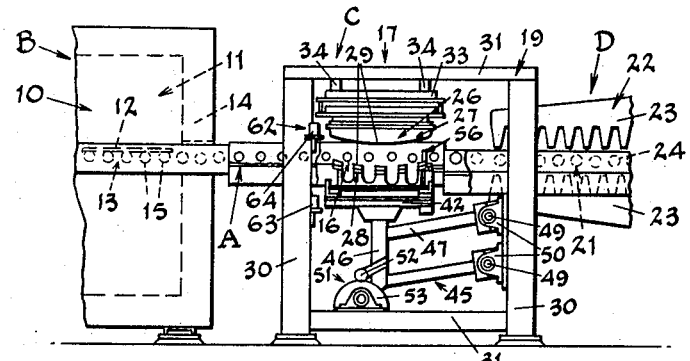
FIG. 1 is a fragmentary side elevation view of a bending and tempering apparatus employing the novel features of the present invention.
Figure 2:
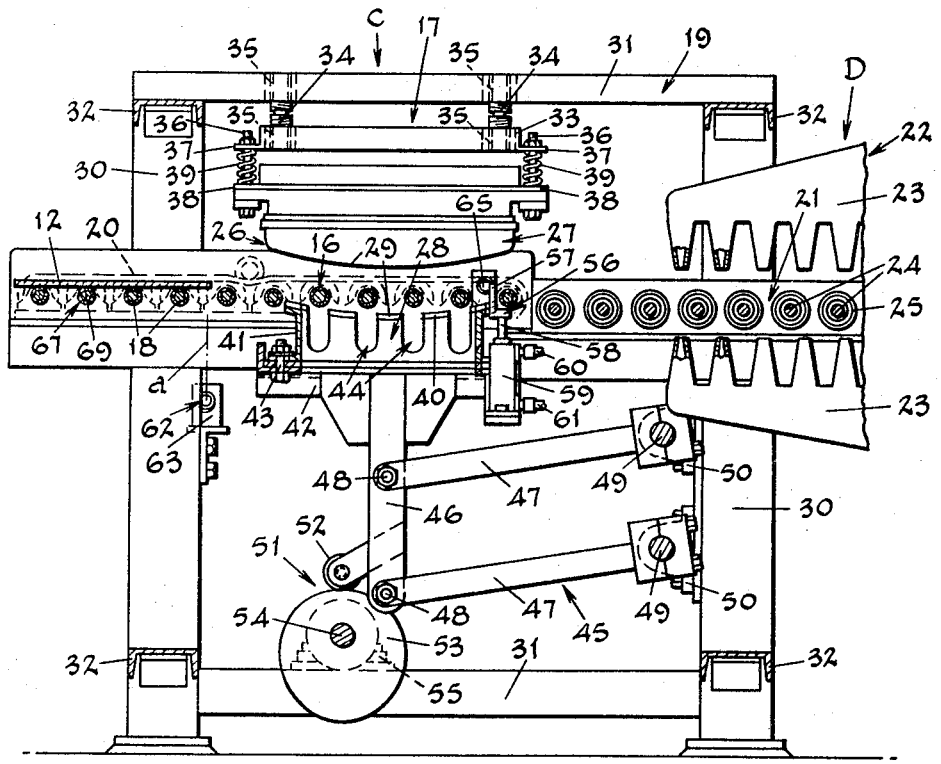
FIG. 2 is an enlarged fragmentary vertical sectional view of the apparatus shown in FIG. 1.

Referring now to FIG. 1, an exemplary apparatus for bending and tempering glass sheets has been shown which apparatus includes a conveyor embodying the novel features of the invention. The illustrated apparatus is particularly adapted for use in the commercial production of curved glazing closures wherein glass sheets are moved successively one by one along a predetermined path by a conveyor system A through a heating area B, a bending area C and finally a tempering area D which areas are contiguous so that each sheet, upon being moved through one area, immediately passes into and through the following area.

In the illustrated apparatus, the sheets are heated in a tunnel-type furnace 10, having an elongated heating chamber 11 defined by refractory walls and heated by burners or equivalent heating devices (not shown). The sheets 12 to be heated are moved through the chamber 11 on a roller conveyor 13 which forms a part of the conveyor system A and extends from the entrance end of the furnace to an oppositely disposed exit end 14. The conveyor 13 is made up of a plurality of horizontally disposed rollers 15 extending transversely across the chamber and spaced apart along the path. All of the rollers 15 forming the conveyor are rotatably driven about their axes by a suitable power drive mechanism (not shown). The sheets are heated during their passage through the chamber 11 and upon emerging from an opening in the exit end 14 of the furnace are received on a second roller conveyor 16, which also forms a part of the conveyor system A, and are moved thereby into the bending area C where they are formed to the desired curvatures by a bending means 17.

The second roller conveyor 16 is also made up of a plurality of horizontally disposed rollers 18 extending transversely across the path and spaced apart along the path with their opposite ends journaled in a suitable framework 19. The rollers 18 are coupled, as by drive chain 20, to a source of power (not shown) which rotates the rollers 18 about their axes.

After being bent, the sheets continue along the path and are received on a third roller conveyor 21 disposed in end-to-end relation with the conveyors 13 and 16, in the heating and bending areas, to complete the conveyor system A. The conveyor 21 moves the sheets through the cooling area D and past cooling means 22 which, in the present instance, comprise blast heads 23 disposed above and below the path and operable to direct opposed blasts of cooling fluid, such as air, toward the conveyor 21 and against the opposite surfaces of the sheets carried thereon. As with the conveyors 13 and 16, the conveyor 21 also is made up of power rotated rollers 24 but in this instance the rollers are provided with spaced collars 25 which minimize the contact between the conveyor and the sheets and permit the cooling air to flow against the lowermost surfaces of the sheets.

Herein the bending means 17 comprises a shaping mold 26 including upper and lower mold parts 27 and 28 located above and below the path and movable relative to each other and to the path to bring complemental shaping surfaces 29 formed thereon into pressing engagement with opposite surfaces of the heated sheets. In the embodiment shown, the upper mold part 27 is mounted in a fixed position above the path and the lower mold part is mounted for movement toward and away from the upper mold part so as to lift a heated sheet from the conveyor and carry it into pressing engagement with the upper mold part.

The mold parts are mounted on the framework 19 which includes a plurality of spaced vertical columns 30 disposed on opposite sides of the path and extending above the conveyor 16. The columns are interconnected with longitudinally and transversely extending channel members 31 and 32 rigidly secured thereto to provide the necessary support for the molds.

The upper mold part 27 is attached to the framework 19 through the medium of a mounting frame 33 carried by threaded rods 34 received in blocks 35 mounted on the mounting frame and the framework. The upper mold part 27 is adjustably secured to the mounting frame 33 by bolts 36 extending through a laterally projecting flange 37 on the frame 33 and a similar flange 38 integral with the mold part. Resilient means such as coil springs 39 telescoped on the bolts 36 and acting between the flanges 37 and 38 maintain the mold part in spaced relation to the frame 33 while permitting the mold part to yield in response to pressures exerted thereagainst by the lower mold part.

The lower mold part 28 includes a ring-type structure having a shaping surface 29 generally conforming in outline to the outline configuration of the finished bent sheet. The ring-type structure (FIG. 3) is formed by bars 40 arranged in a generally rectangular configuration and provided with extensions 41 from the lower surface thereof which are rigidly secured to a carriage 42 by means of bolts 43. The bars 40 and extensions 41 extending longitudinally along the path are provided with recesses 44 to allow the lower mold part to move above the surface of the conveyor 16 between the spaced rollers 18.

The carriage 42 is mounted on the framework 19 for reciprocal movement in a substantially vertical plane toward and away from the path by a four-bar linkage 45 which guides the movements of the carriage. The linkage 45 is formed by four links arranged in a parallelogram. One pair of parallel links comprises a bar 46 depending from the carriage 42 and connected to the columns 30 which form the other link in the pair. The other pair of parallel links comprises two elongated members 47 pivotally secured at one end to the bar 46 by threaded pins 48 with their opposite ends secured to parallel shafts 49 journaled in bearings 50 carried by the columns 30. Since with this arrangement the links of each pair remain parallel to each other at all times, the bar 46 remains parallel to the vertical columns 30 throughout its endwise movements.

Raising and lowering of the carriage 42, and the mold part 28 carried thereby, is effected by a suitable actuating mechanism 51 which, in the present instance, comprises a simple cam and follower arrangement. Generally, this mechanism includes a follower 52 carried by the bar 46 and riding on the periphery of a rotatable disk cam 53 contoured in the conventional manner to impart the desired reciprocal motion to the carriage 42 supporting the lower mold part 28.

The disk cam 53 is fast on a shaft 54 disposed below the conveyor 16 and journaled in bearings 55 carried by the frame work 19. The shaft 54 is coupled to a suitable drive mechanism (not shown) operable to rotate the shaft, and the cam 53 carried thereby, at preselected intervals to raise and lower the mold part 28.

To properly locate a glass sheet between the surfaces of the mold parts, transversely spaced retractable stops 56 are provided in the path of the moving sheet so as to engage the leading edges of the sheets as they are moved into position over the lower part 28. Each of the stops 56 includes an angle member 57 rigidly secured to one end of a rod 58 having its other end connected to a piston slidable in a fluid cylinder 59 secured to the carriage 42. Fluid is supplied to either the head end or rod end of the cylinder through ports 60 or 61 respectively to raise or lower the stops 56 into or out of the path of the moving sheet.

The bending and tempering apparatus is controlled for continuous automatic operation by sensing devices 62 which detect the movement of a sheet along the path and initiate a bending sequence each time a sheet passes through the bending area C. Herein the sensing devices comprise two photoelectric cells spaced apart along the path. One of the photoelectric cells 63 is mounted on a vertical column 30 adjacent the entrance end of the bending section and is activated by a beam of light from a lamp source 64 mounted on a transversely spaced column at the opposite side of the conveyor 16. The lamp source 64 is positioned such that the beam of light emitted thereby is transmitted across the conveyor 16 to the photoelectric cell 63 and is interrupted whenever a sheet leaves the heating chamber and moves into the bending area.

When the beam of light $a$ from the source 64 of the cell 63 is broken by a sheet moving thereby, the cell produces a signal which, through a suitable circuit including time relay means, controls the operation of the conveyor 16. Thus, the speed of the conveyor 16 is reduced as the sheet is moved against the stops and lifted off the conveyor by the lower mold part 28 and, thereafter, the normal speed of the conveyor 16 is resumed to rapidly move the bent sheet onto the third conveyor 21 and through the tempering section.

The other photoelectric cell 65 is secured to the framework 19 adjacent the stops 56 and is activated by a beam of light from a lamp source 66 mounted on the carriage 42. The lamp source 66 and cell 65 are positioned in such a manner that as the sheet engages the stops 56, the light beam $b$ is interrupted producing a signal which activates a drive mechanism to rotate the shaft 54 one turn thereby to raise and lower the lower mold part 28.

Simultaneous with the raising of the lower mold part 28, fluid is introduced through port 60 into the cylinders 59 to lower the stops 56 below the sheet engaging surface on the lower mold part. As it moves upwardly, the lower mold part lifts the heated sheet off of the conveyor 16 and carries it into pressing engagement with the shaping surface 29 of the upper mold part 27. The sheet is then returned to the conveyor 16 and moved thereby onto the third conveyor 21 which advances it through the tempering area D. When the mold part 28 returns to its lowered position and after the bent sheet is moved out of the bending area, fluid is introduced through the port 61 into the cylinder 59 to move the stops 56 into the raised position.

As mentioned above, when the sheets are heated to the elevated temperatures required for bending and tempering glass, temperatures in the neighborhood of 1250° F., they are susceptible to being damaged due to transmitted distortion or due to having their heat-softened surfaces scratched or other marred by the conveyor rollers.

When the sheets are intended for use as glazing closures, any appreciable amount of distortion would be highly undesirable and any scratches or mars in their surfaces would need to be removed, if possible, by a separate scratch polishing operation which is expensive, time consuming and requires the services of highly skilled craftsmen.

Naturally, any imperfections in the surface of the conveyor rollers would be imparted to the surfaces of the sheets being carried thereby. Maintaining the surfaces of the rollers free from such imperfections is difficult since the rollers are subjected to the high temperatures mentioned above. In this connection, the rollsr of the conveyor intended for use in conveying heated glass are conventionally provided with a covering of refractory material which will not fuse to the glass. It has been found that due to the high operating temperatures and the wear to which the rollers are subjected, the refractory covering has a comparatively short service life and the conveyor requires substantially constant maintenance and service. This maintenance involves repairing the refractory covering to maintain a smooth surface and periodically replacing this covering. Moreover, even if the supporting surfaces of the rollers are smooth and free of imperfections, distortion of the sheets and scratching of their surfaces takes place.

Marring of the surfaces of the sheets is particularly apt to occur if there is any relative movement between the conveyor rolls and the sheet surfaces and in the illustrated procedure of bending sheets, this objectionable relative movement is very likely to take place as the sheets are brought into position over the lower mold part 28.

In this connection, it should be appreciated that it is important that the sheets be properly positioned relative to the mold parts before the bending sequence is initiated to insure that the sheet will be bent to the desired curvature. With the apparatus illustrated, a sheet is in the correct position relative to the mold parts when its leading edge is in full contact with both of the stops 56. The instant this occurs, the photoelectric cell initiates the bending sequence and the sheet is lifted free of the conveyor by the lower mold part. If the sheet, however, has not been properly aligned with the conveyor in the first instance or if it should become misaligned while being moved through the furnace, the leading edge thereof will contact the stop at one side of the path before it contacts the stop at the opposite side of the path. In this event, the conveyor continues to operate until the leading edge of the sheet is forced against both stops which means that the conveyor rollers rotate relative to the surface of the sheet.

To enable utilizing a roller-type conveyor to transport heated glass sheets without adversely affecting these sheets, the present invention contemplates a novel conveyor roller having a cover which will not scratch or mar the sheets, which is resilient so as to cushion the sheet on the conveyor, which has a long service life at elevated temperatures and which greatly simplifies maintenance of the conveyor.

To these ends, in accordance with the invention, the roller cover comprises a seamless tube or sleeve 67 braided from strands 68 of a heat and wear-resistant material, which sleeve may be slipped over any standard mandrel 69 to complete the conveyor roller. The braided sleeve 67 is adapted for radial contraction and expansion responsive to longitudinal extension and contraction respectively of the sleeve thereby facilitating placing the cover on the mandrel while at the same time insuring a snug, wrinkle-free fit.

Figure 5:
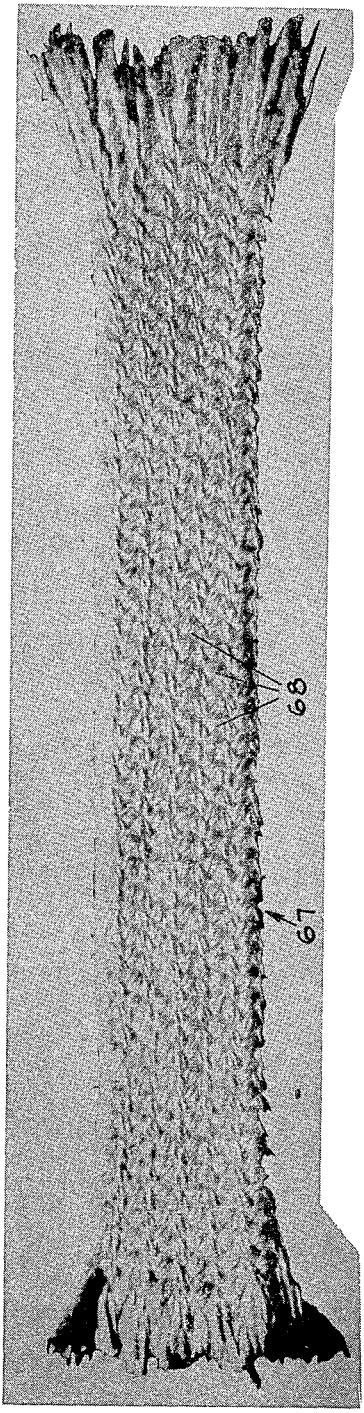
FIGS. 5 and 6 are photographic views of the tubular roller covering of the present invention showing the covering in an expanded and contracted condition.
Figure 6:
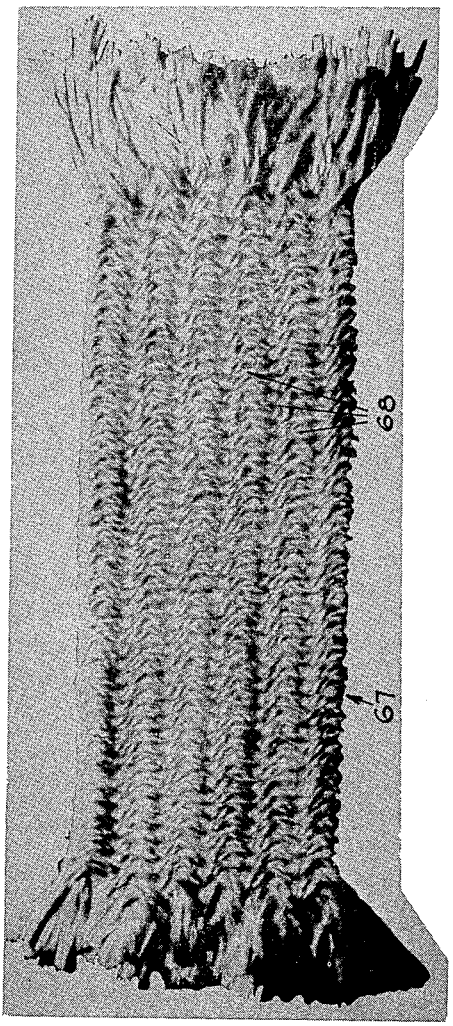

While the sleeve 67 could be made from a number of different materials, excellent results have been obtained by using a staple fiber glass material in which the short glass fibers are twisted or braided together to form the strands 68 which are then braided together about a common axis with each strand extending spirally about the cover to form the tubular sleeve of mesh fabric. The tubular sleeve 67 is able to contract radially when extended endwise, as shown in FIG. 5, and to expand radially when contracted endwise as shown in FIG. 6.

The fiber glass cover provides a soft relatively smooth surface which does not mar or scratch the surfaces of the heated glass sheets in contact therewith even if the conveyor roller is rotated relative to the sheet. Moreover, since the sleeve 67 is resilient, it cushions the glass sheets on the conveyor so that the sheets will not be distorted by the configuration of the rollers making up the conveyor.

The cushioning effect provided by the tubular sleeve 67 depends to some extent upon the wall thickness of the sleeve which, in turn, depends upon the size of the individual strands 68. It has been found that a tube having a wall thickness of about $\frac{1}{16}$ of an inch provides sufficient cushioning to overcome transmitted distortion. When these strands 68 are braided together in the manner described above, the cushioning effect of the resulting sleeve 67 may be varied to obtain optimum cushioning by extending or contracting the sleeve longitudinally thereby radially constricting or expanding the sleeve.

When made of strands of staple glass fibers, it has been found that the sleeve will stand up for comparatively long periods of time under extreme wear and temperature conditions, such as would occur in the above-described process, without damage to the sheet engaging surface or loss of the desired cushioning effect. These improved wear characteristics are believed to result from the fact that breaking or failure of the individual fibers making up each strand, such as could result from wear or the like, does not destroy the entire strand and thus does not adversely affect the sleeve as a whole. In fact, it has been discovered that breakage of the individual short fibers adds to the cushioning effect provided by the sleeve. For comparison, it has been observed that under actual production conditions, a roller constructed in accordance with the present invention will withstand substantially continuous operation for periods of seven to eighteen days without maintenance while a conveyor roller constructed in the conventional manner with a refractory covering will withstand this continuous operation for periods of only one or two days. Thus it will be appreciated that the conveyor roller of the present invention materially reduces the time and expense involved in maintaining the conveyor in proper operating condition.

Further in this regard, it will be appreciated that maintenance of the present conveyor roller is a comparatively simple task requiring only that a worn sleeve be slipped off of a mandrel and replaced by a new sleeve. Replacement of the sleeve is easily accomplished since the sleeve may be radially expanded thereby increasing its diameter, enabling it to be easily slipped into position on the mandrel and thereafter longitudinally extended to constrict the tube radially thereby to insure a close fit of the sleeve on the mandrel and to achieve the desired cushioning effect.

Figure 3:
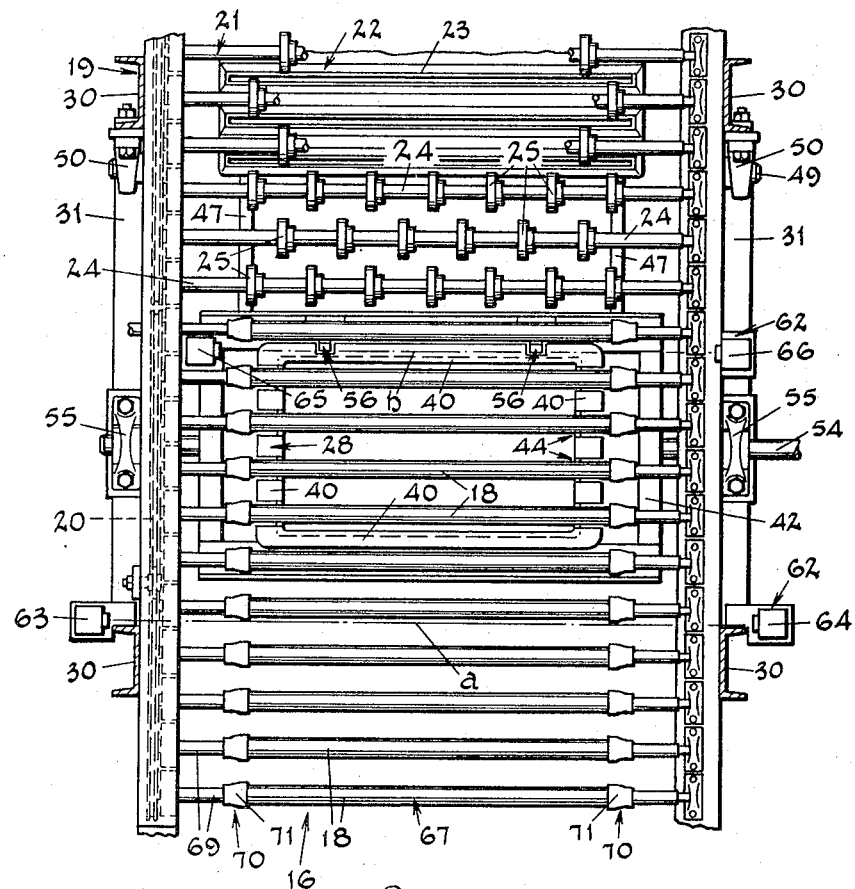
FIG. 3 is a fragmentary plan view of the conveyor system included in the apparatus shown in FIG. 1.
Figure 4:
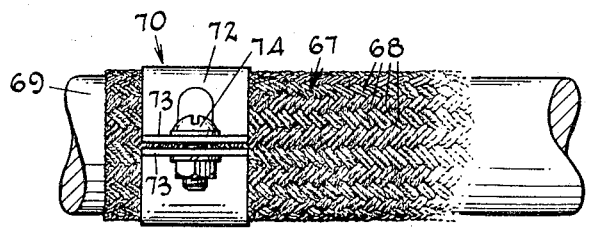
FIG. 4 is a fragmentary view of a support roll constructed in accordance with the present invention.

To maintain the sleeve 67 in the proper position and to prevent its being radially expanded due to the centrifugal force to which it is subjected during the operation of the conveyor, means 70 are provided to clamp its opposite ends to the mandrel 69. These means may comprise adhesive tape 71 wrapped around the opposite ends of the sleeve and overlapping onto the mandrel such as shown in FIG. 3 or a clamp comprising a band 72 encircling the sleeve 67 and the mandrel 69 and having flanges 73 on its free ends which are drawn together by a threaded fastener 74 to clamp the sleeve onto the mandrel.

It is to be understood that the form of the invention herewith shown and described is to be taken as a preferred embodiment of the same, and that various changes in the shape, size and arrangement of parts may be resorted to without departing from the spirit of the invention.

I claim:

1. A conveyor roller for use in transporting heated glass sheets having, in combination, a mandrel, a plurality of strands of heat and wear resistant material braided about a common axis to form a radially expansible and contractible, soft, non-abrasive, resilient, tubular sleeve disposed on said mandrel, and means for securing said sleeve on said mandrel.

2. A conveyor roller as defined in claim 1, in which said strands are formed from staple glass fibers.

3. A conveyor roller for use in transporting heated glass sheets having, in combination, a mandrel, a soft, non-abrasive, resilient, heat and wear resistant covering on said mandrel, said covering comprising a plurality of strands braided together about a common axis to form an elongated radially expansible and contractible tubular sleeve adapted to be slipped over said mandrel while in a radially expanded condition and to be brought into close contact with said mandrel when extended longitudinally to radially contract said sleeve, the resiliency of said cover being varied by longitudinally extending or contracting said sleeve, and means for securing the opposite ends of said sleeve on said mandrel.

4. A conveyor roller as defined in claim 3, in which said strands are formed from staple glass fibers.

5. In a conveyor for transporting heated glass sheets, a plurality of conveyor rollers disposed side by side along a path and rotatable about parallel axes extending transversely of said path, each of said rollers comprising a mandrel, a soft, non-abrasive, resilient, heat and wear resistant covering on said mandrel, said covering comprising a plurality of strands formed from staple glass fibers braided together about a common axis to form a tubular sleeve, with each of said strands extending spirally around said sleeve, said sleeve being radially expansible and radially contractible in response to longitudinal expansion and contraction of said sleeve, and means for securing the opposite ends of said sleeve on said mandrel.

References Cited by the Examiner
UNITED STATES PATENTS
3,116,053   12/1963   Ericsson.

ANDRES H. NIELSEN, *Primary Examiner.*